United States Patent
Buell

[15] 3,660,125
[45] May 2, 1972

[54] BRIGHTENING PLASTICS WITH 2-ARYL-5-CYANONAPHTHOXAZOLE BRIGHTENERS

[72] Inventor: Bennett George Buell, Bound Brook, N.J.

[73] Assignee: American Cyanamid Company, Stamford, Conn.

[22] Filed: Apr. 13, 1970

[21] Appl. No.: 28,146

[52] U.S. Cl. ............... 106/176, 252/301.2 W, 260/45.8 NZ, 260/307 D
[51] Int. Cl. ........................................ C08b 27/68, C08f 45/67
[58] Field of Search ............... 260/45.8 NZ, 307 D; 106/176; 252/301.2 W

[56] References Cited

UNITED STATES PATENTS 3,336,330   8/1967   Schinzel et al. ........................ 260/307
3,167,565   1/1965   Buell ..................................... 260/307
3,449,333   6/1969   Dorlars et al. ......................... 260/240
3,526,768   9/1970   Rai et al. ............................... 250/71

Primary Examiner—M. J. Welsh
Assistant Examiner—R. A. White
Attorney—John L. Sullivan

[57] ABSTRACT

Translucent plastics, particularly polyvinyl chloride, cellulose acetate, and polyolefins such as polyethylene are brightened by distributing uniformly therethrough about 0.01 to 0.5 percent by weight of a 2-aryl-5-cyanonaphthoxazole wherein the 2-aryl moiety is naphthyl, styrylphenyl, anisoylaminophenyl, carboxybenzoylaminophenyl, phenylureidophenyl or acylaminophenyl in which the acyl group is the residue of a higher fatty acid.

3 Claims, No Drawings

BRIGHTENING PLASTICS WITH 2-ARYL-5-CYANONAPHTHOXAZOLE BRIGHTENERS

This invention relates to the brightening of translucent plastics such as polyvinyl chlorides, nitrocellulose, cellulose acetate and triacetate, nylons, poly(methyl methacrylate) and polyolefins, such as polyethylene, polypropylene, polystyrene and the like. It is based on the discovery that such plastics can be brightened by distributing throughout the substance thereof, in brightening quantities, a 2-aryl-5-cyanonaphthoxazole brightener of the type hereinafter described. The invention includes the brightened plastics themselves, methods wherein they are brightened by incorporating one or more of these compounds therein, and also certain 2-aryl-5-cyanonaphthoxazoles as new chemical compounds.

The brightening of textile fibers and fabrics by applying optical brightening or whitening agents to the surfaces thereof is well known, and several entire classes of brightening agents are known to be effective for this purpose. The brightening of plastics intended for molding, casting or extrusion into relatively thick pieces or sections presents, however, an essentially different problem, for the brightening agents are distributed more or less uniformly throughout the substance of these plastics instead of being located on their surfaces. They brighten the plastics by fluorescing after absorption of light in the ultra-violet wavelengths, and the visual appearance of the brightened plastic is therefore influenced by such factors as the particular wavelength of fluorescence of the added brightener, the color and nature of the plastic substrate in which it is incorporated, and also the compatibility and affinity of the brightener with and for the particular plastic. These brighteners have stability to heat, and particularly to light when incorporated into the plastic.

It is evident, therefore, that the usefulness of a compound as a brightener for a translucent plastic cannot be predicted on the basis of its chemical structure alone. On the contrary, each compound must be evaluated individually on the basis of its behavior in individual plastics with particular reference to the extent and color of its fluorescence in sunlight and the other factors discussed above.

I have found that all of these requirements are fulfilled by certain 2-arylnaphthoxazoles when they contain a cyano-substituent in their 5 position. Polyvinyl chloride in which small quantities of these materials are distributed uniformly is both brighter and appears to be more clear than a control sample containing no brightener. Polyolefins such as polyethylene and polypropylene are much brighter, and other translucent plastics such as nitrocellulose, cellulose acetate and triacetate, nylons and poly(methyl methacrylate) are likewise improved. These results are obtained when the brightening compounds are present in quantities within the range of about 0.01 to 0.5 percent and preferably 0.02 to 0.1 percent based on the weight of the plastic, which quantities are sometimes hereinafter described as brightening amounts. Larger quantities could of course be used, but do not ordinarily give any further improvement.

The 2-aryl-5-cyanonaphthoxazoles of my invention are compounds of the formula

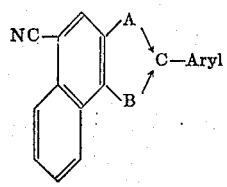

in which A is one member of the group consisting of oxygen linked singly to the oxazole carbon atom C and nitrogen bonded doubly to the same carbon atom and B is the other member of this group. I have found that the above-described brightening properties are possessed by the compounds of this class wherein the aryl moiety is naphthyl, styrylphenyl, anisoylaminophenyl, carboxy-benzoylaminophenyl, phenylureidophenyl or acylaminophenyl in which the acyl group is the residue of a higher fatty acid, preferably of about 12–18 carbon atoms such as lauric acid, myristic acid, palmitic acid, oleic acid, stearic acid and the like. Some of these compounds, notably the 2-anisoylaminophenyl-5-cyanonaphthoxazoles and the 2-naphthyl-5-cyanonaphthoxazoles are new chemical compounds, and therefore their properties and their methods of preparation are described in detail in the following examples.

The brighteners of my invention are prepared from 4-cyanoaminonaphthols. When a 1-amino-4-cyano-2-naphthol is used the naphthoxazole is of the 1,2-d type, whereas the 2,1-d naphthoxazoles are obtained from 2-amino-4-cyano-1-naphthol. The two types are equally good brighteners, and therefore both are included within the scope of my invention.

In preparing the brighteners, the cyanoaminonaphthol is reacted with an appropriately substituted aroyl chloride to form an amide, which is ring-closed by pyrolysis or by fusion with acid agents such as boric acid to form the naphthoxazole. This can then be further reacted if necessary, as by the reduction of nitro groups to amines, acylation and the like, in order to complete the formation of one of the above-described 2-aryl substituents.

Ordinarily the amide-forming reaction is carried out at an elevated temperature and in an organic medium such as pyridine, chlorobenzene, dichlorobenzene or acetone. Temperatures may vary between 50°C. and reflux. The intermediate product is obtained as an insoluble precipitate or, when the solvent is water-miscible, by drowning the reaction product in water. The ring-closing reaction to give the oxazole is conducted at elevated temperatures by direct heating without a solvent or by fusing with acid agents such as boric acid, paratoluene sulfonic acids, polyphosphoric acid and the like. The product is preferably purified by such methods as recrystallization from methoxyethanol or by chromatography.

The brighteners so obtained are usually incorporated into the plastics while the latter are in a melted or plastic state. Thus the brightener in finely divided form may be worked into the plastic on heated rolls by the procedures described in Example 1.

My new brighteners shown a strong fluorescence under ultra-violet light after incorporation into plastics. For this reason they strongly brighten polyvinyl chloride, polyethylene, cellulose acetate and the other plastics enumerated above. In polyvinyl chloride and in polyethylene especially they have excellent light fastness, which is in many cases superior to known brighteners. For example, the 2-(p-anisoylaminophenol)-5-cyanonaphthoxazole of Example 1 is twice as fast to light as a commercial styryl benzoxazole brightener in polyvinyl chloride.

The fluorescent hue of these brighteners is a true blue fluorescence when they are uniformly incorporated into translucent or transparent plastics in the brightening quantities described above. In many cases they make a clear plastic appear clearer still; the reason for this is unknown, but it is an added advantage of these embodiments of the invention.

The invention will be further described and illustrated by the following specific examples, wherein the special affinities of individual compounds for specific plastics or polymeric substrates are noted together with the preparation and properties of the compound. It will be understood, however, that the invention in its broader aspects is not limited to these examples.

EXAMPLE 1

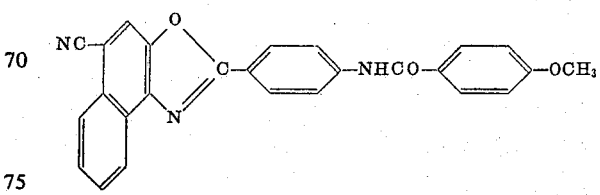

A mixture of 25 grams (0.136 mole) of 1-amino-4-cyano-2-naphthol, 27.5 g. (0.148 mole) of 4-nitrobenzoyl chloride and 400 ml. of pyridine is heated to the boil. When the reaction is complete, the mixture is cooled, diluted with water, filtered, and the product washed with water and dried. Yield is 41.7 g. of 1-(p-nitro-benzoylamino)-4-cyano-2-naphthol, product "A."

The product "A" is mixed with 25 g. of boric acid and heated with stirring to 255°C. When cyclization is complete, the melt is cooled and taken up in 500 ml. of methoxyethanol. The mixture is boiled, cooled and the product filtered, washed with alcohol and dried in vacuo. The yield of 5-cyano-2-(p-nitrophenyl-naphth[2,2,d]oxazole, product "B" is 17.3 g. It should be noted that the position 4 in the naphthol becomes position 5 in the naphthoxazole.

Reduction of the nitro oxazole "B" to the corresponding amino oxazole "C" is carried out in a mixed solvent of 500 ml. methoxyethanol and 500 ml. alcohol, at 80°C., by adding 16 g. of sodium sulfhydrate in 40 ml. of water. When the reaction is complete, the solution of the product is clarified by treatment with activated charcoal and filtration. The amino product, "C," in the filtrate is precipitated by water. It is filtered, washed with alcohol and dried. Yield is 12.63 g. of 2-(p-aminophenyl)-5-cyanonaphth[1,2-d]oxazole, product "C." Recrystallization from monochlorobenzene with activated charcoal gives 9.20 grams m.p. 275°–278°C. The product "C" exhibits a blue-green fluorescence in alcohol.

Acylation of the above amino oxazole, product "C," is effected by mixing 7.6 g. of that product in 500 ml. pyridine with 5.6 g. of p-anisoyl chloride. The solution is heated on a steam bath for one hour and then cooled. Water is added to precipitate the product. The product is filtered washed with water and dried. Yield is 10.29 g. crude of 2-(p-anisoylaminophenyl)-5-cyanonaphth[1,2-d]oxazole.

The product is recrystallized from ortho dichloro-benzene after clarifying in the presence of activated charcoal and then from 900 ml. of methoxyethanol and dried to give 8.40 g. m.p. 283°–5C. It is dissolved in 250 ml. of hot dimethylformamide, a few ml. of formaldehyde added, and diluted with 200 ml. of ethanol. After standing, the product is filtered, washed with ethanol and dried. Yield 7.00 g. m.p. 280°–4°C. 2-(p-anisoylaminophenyl)-5-cyanonaphth[1,2-d]oxazole. $\lambda_{max}$ = 360. m$\mu$.

If, in the foregoing preparation, an equal quantity of 2-amino-4-cyano-1-naphthol is substituted in the first step, the 2-(p-nitrobenzoylamino)-4-cyano-1-naphthol, product A', is obtained in the same yield. When this is carried through the remaining steps of the process the product is 2-(p-anisoylaminophenyl)-5-cyanonaphth[2,1-d]oxazole.

These compounds are strong brighteners of polyvinyl chloride plastics and the brightened plastics have superior lightfastness. They may be incorporated uniformly into polyvinyl chloride or other plastic by the following procedure.

A steam heated 2-roll Thropp-mill one roll at 320°F. and the other roll at 275°F. is used for mixing a compound of this example with the plastic. One hundred grams of polyvinyl chloride powder is placed in the nip and banded. When a workable molten mass is obtained, 20 milligrams of the oxazole compound is added. The band is cut at every pass for 50 passes. It is then transferred to a molding machine and molded at 320°F. into a sheet or film of 20 mils.

The film containing the oxazole compound is much brighter than a blank film similarly derived. Under ultra-violet light it shows a strong blue fluorescence.

When exposed to a fluorescent sun lamp, the brightened film holds up 100 hours before a break occurs. It is twice as fast to light as a styrylbenzoxazole brightener similarly incorporated in polyvinyl chloride.

The compounds also brighten polyethylene, polystyrene, cellulose acetate and poly(methylmethacrylate) when incorporated therein by the above-described procedure in amounts of 0.01% to 0.5 percent on the weight of the plastic.

EXAMPLE 2

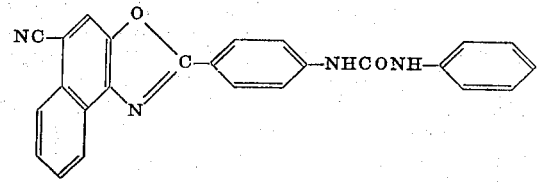

To 1.42 g. (0.005 mole) of 2-(p-aminophenyl)-5-cyanonaphth[1,2-d]oxazole (product "C" of Example 1) is added 0.6 ml. (0.005 mole) phenylisocyanate. The mixture is heated on a steam bath until the reaction is complete. Hot alcohol is added. The product is filtered. It is recrystallized from methoxyethanol to give 1 g. product m.p. 213°–215°C. It is recrystallized from monochlorobenzene and then from a methoxyethanol-ethanol mixture to give 0.17 g. m.p. above 350°C. $\lambda_{max}$ = 363 m$\mu$.

This compound, which is 2-(p-phenylureidophenyl)-5-cyanonaphth[1,2-d]oxazole, brightens polyvinyl chloride strongly when incorporated therein in amounts of from about 0.02 to 0.1 percent on the weight of the plastic by the procedure described in Example 1 and has good fastness to light. It also brightens nylon.

EXAMPLE 3

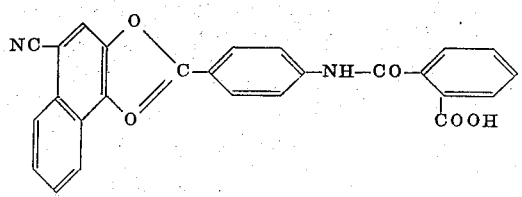

To 20 ml. of pyridine is added 2.84 g. (0.01 mole) of 2-(p-aminophenyl)-5-cyanonaphth[1,2-d]oxazole prepared as in Example 1, "C" (an intermediate) and 1.48 g. (0.01 mole) of phthalic anhydride. The mixture is boiled and then set on a steam bath for 1 hour. It is poured into cold water and filtered. The product is taken up in 250 ml. of ethanol and made alkaline with 5N sodium hydroxide. The resultant sodium salt of the oxazole is separated and dissolved in 200 ml. alcohol and 50 ml. water. After heating to dissolve and treating with activated charcoal, the solution is clarified by filtration and then acidified with 5N hydrochloric acid. The product is filtered, washed with alcohol and water and dried in vacuo. Yield is 1.39 g. The m.p. is higher than 303°C. The ultra-violet spectrum shows $\lambda_{max}$ = 370 m$\mu$.

This compound, which is 2(p-carboxybenzoylaminophenyl)-5-cyanonaphth[1,2-d]oxazole, brightens both polyvinyl chloride and polyethylene when incorporated therein in amounts of about 0.05–0.1 percent by weight by the procedure of Example 1. It is fast to light for the full life of the brightened plastic.

EXAMPLE 4

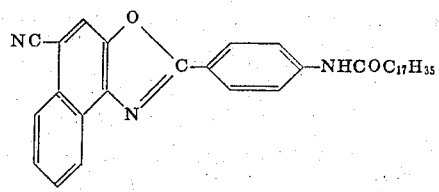

To 25 ml. pyridine is added 1.00 g. (0.0035 mole) of product "C" of Example 1 and 1.18 g. (0.0039 mole) of stearoyl chloride. The whole is heated to the boil and cooled. It is drowned in ice water and the product filtered and dried. Recrystallization from monochlorobenzene gives 1.22 g. crude product m.p. 168°–184°C. This is chromatographed from chloroform on alumina and again recrystallized from monochlorobenzene to give 0.59 g. m.p. 185°–186°C., of 2(p-stearoylaminophenyl)-5-cyanonaphth[1,2-d]oxazole $\lambda_{max}$ = 355 m$\mu$.

When used in amounts of 0.05–0.15 percent by weight this compound brightens polyvinyl chloride, in which it shows good lightfastness. It also brightens polyethylene.

EXAMPLE 5

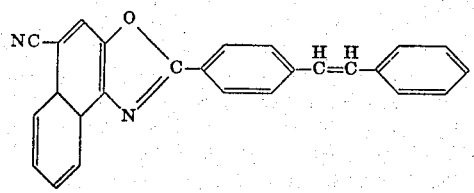

Equimolecular amounts of 1-amino-4-cyano-2-naphthol and p-styrylbenzoyl chloride are heated in pyridine for about 30 minutes or until formation of the anilide is complete. This is isolated by drowning in water and filtering. It is then dried and fused with an equimolecular amount of boric acid at a temperature of 240°C. for 20 minutes to ring-close to the oxazole. This is cooled, taken up in methoxyethanol, treated with activated charcoal, filtered and reprecipitated with water, and collected and dried.

The 2-(p-styrylphenyl)-5-cyanonaphth[1,2-d]oxazole so obtained is further purified by recrystallizing from methoxyethanol and water. It then melts at 248°–249°C.; its ultraviolet absorptivity $\lambda_{max}$ is at 375 m$\mu$.

This compound brightens polyvinyl chloride, giving a slightly greenish blue effect of good lightfastness when incorporated in amounts of about 0.02–0.06 percent by weight. It gives a similar effect in cellulose acetate and also in polyethylene. A representative procedure for incorporating it into the latter is as follows.

A steam heated two-roll Thropp-mill one roll at 250°F. and the other roll at 100°C. is used for mixing. One hundred grams of polyethylene beads are placed in the nip and banded. Twenty milligrams of the compound is added to the banded polyethylene. The band is cut at every pass for 30 passes. It is then molded under pressure at 280°F. into a 20 mil sheet.

Appearance of the sheet is much whiter than an untreated sheet. In polyethylene it is superior in brightness to the known brighteners such as a 2-styrylbenzoxazole brightener.

This compound has special affinity for polyester textile fibers when applied from acid bath in the presence of a carrier. It imparts a slightly greenish blue fluorescence. Since the commercial ethylene-bis-benzoxazole brighteners in current use for polyester tend to be too red, this more greenish blue fluorescence has merit.

The brightener also has strong affinity for nylon, producing a greenish blue fluorescence.

EXAMPLE 6

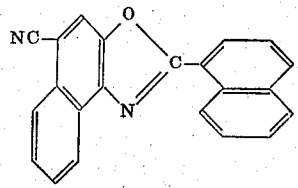

To 50 ml. thionyl chloride is added 3.44 g. (0.02 mole) of 1-naphthoic acid. When conversion to the acid chloride is complete it is isolated then 3.68 g. of 1-amino-4-cyano-2-naphthol in 50 ml. pyridine is added. The whole is refluxed two hours, then drowned in water. The pyridine is neutralized with 5N hydrochloric acid. The product precipitates, is filtered and dried. It is then fused with 1 g. of boric acid at 250°C. for 20 minutes. The product is recrystallized from methoxyethanol. It is chromatographed in chloroform through alumina using chloroform as eluant. The chloroform is stripped off and the product recrystallized from methoxyethanol and activated charcoal. The product obtained is 2-(1-naphthyl)-5-cyanonaphth[1,2-d]oxazole m.p. 239°C. $\lambda_{max}$ is 365 m$\mu$.

It brightens polyvinyl chloride and shows good fastness to light. Film containing this compound appears more clear than film without it. It also brightens polyester fibers when applied with a carrier in aqueous bath.

EXAMPLE 7

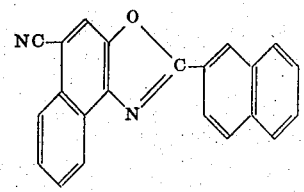

In the procedure of Example 6 if an identical amount of 2-naphthoic acid is used instead of 1-naphthoic acid and the rest of the procedure kept the same, the product obtained is 2-(2-naphthyl)-5-cyanonaphth[1,2-d]oxazole m.p. 253°C.

$\lambda_{max}$ is 355 m$\mu$

It brightens polyvinylchloride, causing it to appear very slightly clearer and is of good fastness in this plastic.

What I claim is:

1. A brightened plastic of the group consisting of polyvinyl chloride and polyolefin plastics having uniformly distributed therethrough about 0.01 to 0.5 percent by weight of a 2-aryl-5-cyanonaphthoxazole wherein the 2-aryl moiety is a member of the group consisting of naphthyl, styrylphenyl, anisoylaminophenyl, carboxybenzoylaminophenyl, phenylureidophenyl and acylaminophenyl in which the acyl group is a higher fatty acid residue.

2. A brightened plastic of the group consisting of polyvinyl chloride, cellulose acetate and polyethylene having uniformly distributed therethrough about 0.01 to 0.5 percent by weight of a 2-aryl-5-cyanonaphthoxazole of the group consisting of 2-(p-anisoylaminophenyl)-5-cyanonaphthoxazole and 2-(p-styrylphenyl)-5-cyanonaphthoxazole.

3. A brightened plastic according to claim 1 wherein the 2-aryl-5-cyanonaphthoxazole is a 2-naphthyl-5-cyanonaphthoxazole.

* * * * *